United States Patent
Yokoi et al.

(10) Patent No.: US 12,115,855 B2
(45) Date of Patent: Oct. 15, 2024

(54) INSTRUMENT PANEL

(71) Applicants: TOYOTA JIDOSHA KABUSHIKI KAISHA, Aichi-ken (JP); SUBARU CORPORATION, Tokyo (JP)

(72) Inventors: Takeshi Yokoi, Toyota (JP); Masayuki Tado, Toyota (JP); Shotaro Inoue, Nisshin (JP)

(73) Assignees: TOYOTA JIDOSHA KABUSHIKI KAISHA, Aichi-ken (JP); SUBARU CORPORATION, Tokyo (JP)

( * ) Notice: Subject to any disclaimer, the term of this patent is extended or adjusted under 35 U.S.C. 154(b) by 353 days.

(21) Appl. No.: 17/694,675

(22) Filed: Mar. 15, 2022

(65) Prior Publication Data

US 2022/0314802 A1 Oct. 6, 2022

(30) Foreign Application Priority Data

Apr. 6, 2021 (JP) ................................ 2021-064615

(51) Int. Cl.
*B60K 35/10* (2024.01)

(52) U.S. Cl.
CPC .................................... *B60K 35/10* (2024.01)

(58) Field of Classification Search
CPC ........ B60K 35/10; B60K 35/80; B60K 35/50; B60K 37/00; B60K 37/20; B60K 2360/60; B60K 2360/61; B60K 2360/682; B60K 2360/691; B60K 2360/693; B60K 2360/84; B62D 25/14
USPC .............................................. 296/70; 180/90
See application file for complete search history.

(56) References Cited

U.S. PATENT DOCUMENTS

2013/0257086 A1* 10/2013 Merkel ................. B60K 37/00
                                                     296/70

FOREIGN PATENT DOCUMENTS

| DE | 102012015600 A1 | * | 3/2013 | ............. B60K 37/04 |
|---|---|---|---|---|
| JP | H10-264683 A | | 10/1998 | |
| JP | 2001176348 A | * | 6/2001 | |
| JP | 2003039986 A | * | 2/2003 | |
| JP | 2004-235037 A | | 8/2004 | |
| JP | 2004-299550 A | | 10/2004 | |
| JP | 2006-327220 A | | 12/2006 | |
| JP | 2009-40139 A | | 2/2009 | |
| JP | 2020-093735 A | | 6/2020 | |
| KR | 100551816 B1 | * | 2/2006 | |

OTHER PUBLICATIONS

Kwon (KR 100551816 B1), machine translation (Year: 2006).*
Ataka (JP 2001176348 A), machine translation (Year: 2001).*
Izumo (JP 2003039986 A), machine translation (Year: 2003).*

* cited by examiner

*Primary Examiner* — Jason S Morrow
*Assistant Examiner* — Wenwei Zhuo
(74) *Attorney, Agent, or Firm* — HAUPTMAN HAM, LLP

(57) ABSTRACT

An instrument panel includes a lower panel located in front of a front seat, a side panel facing a front door, and a switch. The lower panel includes a lower panel side overlapping the side panel on a back side of the side panel. The switch is fixed to the lower panel side, and an operating part of the switch is exposed through a hole provided in the side panel.

3 Claims, 6 Drawing Sheets

INSTRUMENT PANEL

CROSS-REFERENCE TO RELATED APPLICATION

This application claims priority to Japanese Patent Application No. 2021-064615 filed on Apr. 6, 2021, incorporated herein by reference in its entirety.

BACKGROUND

1. Technical Field

The technology described in the specification relates to an instrument panel for a vehicle.

2. Description of Related Art

A vehicle includes an instrument panel (for example, Japanese Unexamined Patent Application Publication No. 2009-040139 (JP 2009-040139 A)). An instrument panel is a decorative part extending from the right end to left end of a cabin under a windshield. The term "instrument panel" means not only a plate that supports meters but also the entire cover that covers cables and reinforcement members (instrument panel reinforcement and the like) in front of the cabin. An instrument panel can also be called a dashboard.

SUMMARY

Various switches are on an instrument panel. The instrument panel includes a side panel facing a front door. A switch can be placed on the side panel. The switch placed on the side panel can be seen when the front door is open. A switch directly attached to the side panel looks not good. The specification provides a technology for disposing a switch on a side panel with a good appearance.

An aspect of the present disclosure relates to an instrument panel. The instrument panel includes a lower panel located in front of a front seat, a side panel facing a front door, and a switch. The lower panel includes a lower panel side overlapping the side panel on a back side of the side panel. The switch is fixed to the lower panel side, and an operating part of the switch is exposed through a hole provided in the side panel. With the structures described above, the lower panel of the instrument panel has a lower panel side extending along the back side of the side panel. The switch is fixed to the lower panel side. Only the operating part of the switch is exposed from the side panel, and the lower panel side that fixes the switch cannot be seen from the outside. It is possible to place the switch on the side panel with a good appearance.

In the instrument panel, the switch may include a flange overlapping an edge of the hole of the side panel. When the edge of the hole and the flange overlap each other, no gap is formed between the edge of the hole and the switch, so a further good appearance is obtained.

The instrument panel may further include a plurality of ribs provided on the back side of the side panel and surrounding the flange. The plurality of ribs positions the flange (that is, the switch). When the plurality of ribs for positioning is provided, the position of the operating part (switch) is accurately determined with respect to the hole of the side panel.

In the instrument panel, the switch may be typically a cutoff switch configured to deactivate an airbag. In the instrument panel, the side panel may be placed on a front passenger seat side.

The details of the technology described in the specification and further improvement will be described below.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
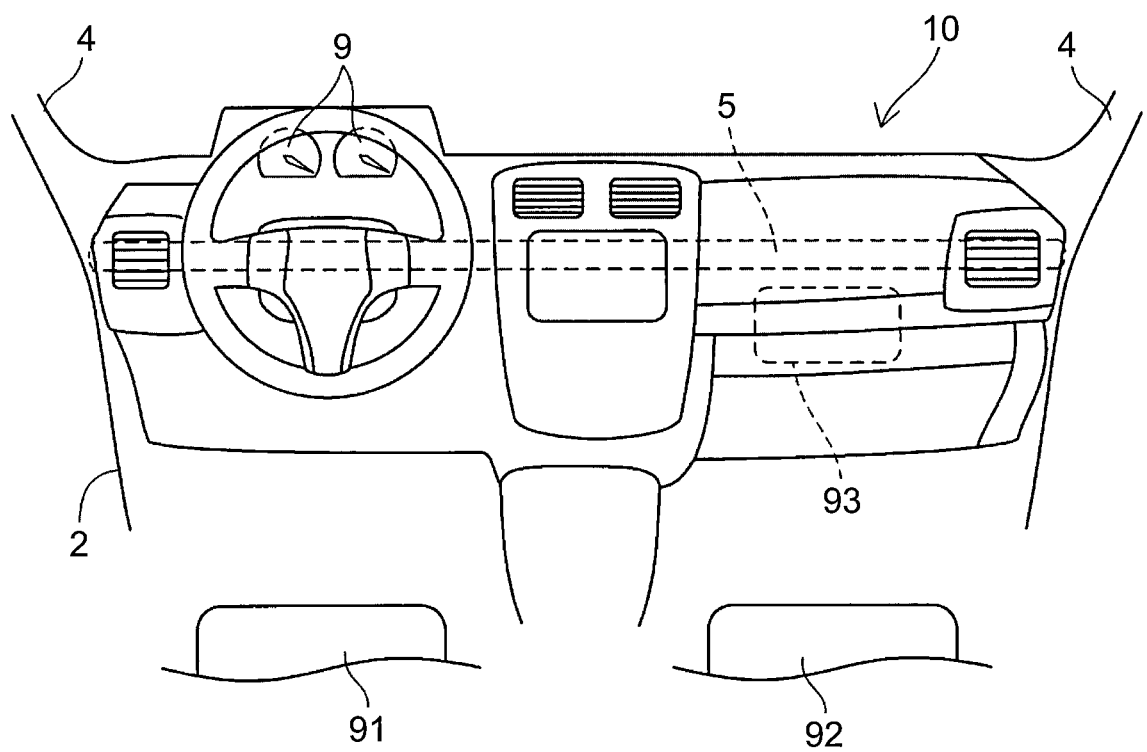
FIG. 1 is a front view of an instrument panel according to an embodiment.

An instrument panel 10 according to an embodiment will be described with reference to the accompanying drawings. FIG. 1 is a front view of the instrument panel 10 attached to a vehicle body 2. Fr, Up, and RH in the coordinate system in the drawing respectively mean the front side, upper side, and right-hand side of the vehicle body 2. The meaning of each of the axes in the coordinate system also applies to the other drawings. In the specification, "front", "rear", "right", and "side" mean directions with reference to the vehicle body 2.

An instrument panel in a narrow sense means a meter unit 9 in front of a driver seat 91. The instrument panel 10 in the specification means a part disposed from one end to the other end in a vehicle width direction at the front of a cabin of the vehicle body 2. In other words, the instrument panel 10 means a decorative part placed in front of the driver seat 91 and the front passenger seat 92 under a windshield. An instrument panel can also be called a dashboard. The instrument panel 10 is made of a resin.

An instrument panel reinforcement 5 is placed on the inner side of the instrument panel 10. The instrument panel reinforcement 5 is a beam extending in the vehicle width direction. The instrument panel reinforcement 5 is coupled to each of a pair of front pillars 4. The instrument panel reinforcement 5 is a part that belongs to a frame that ensures the strength of the vehicle body 2, and protects the cabin from impact of a collision.

An airbag 93 is placed in front of the front passenger seat 92. The airbag 93 is also covered with the instrument panel 10.

Figure 2:
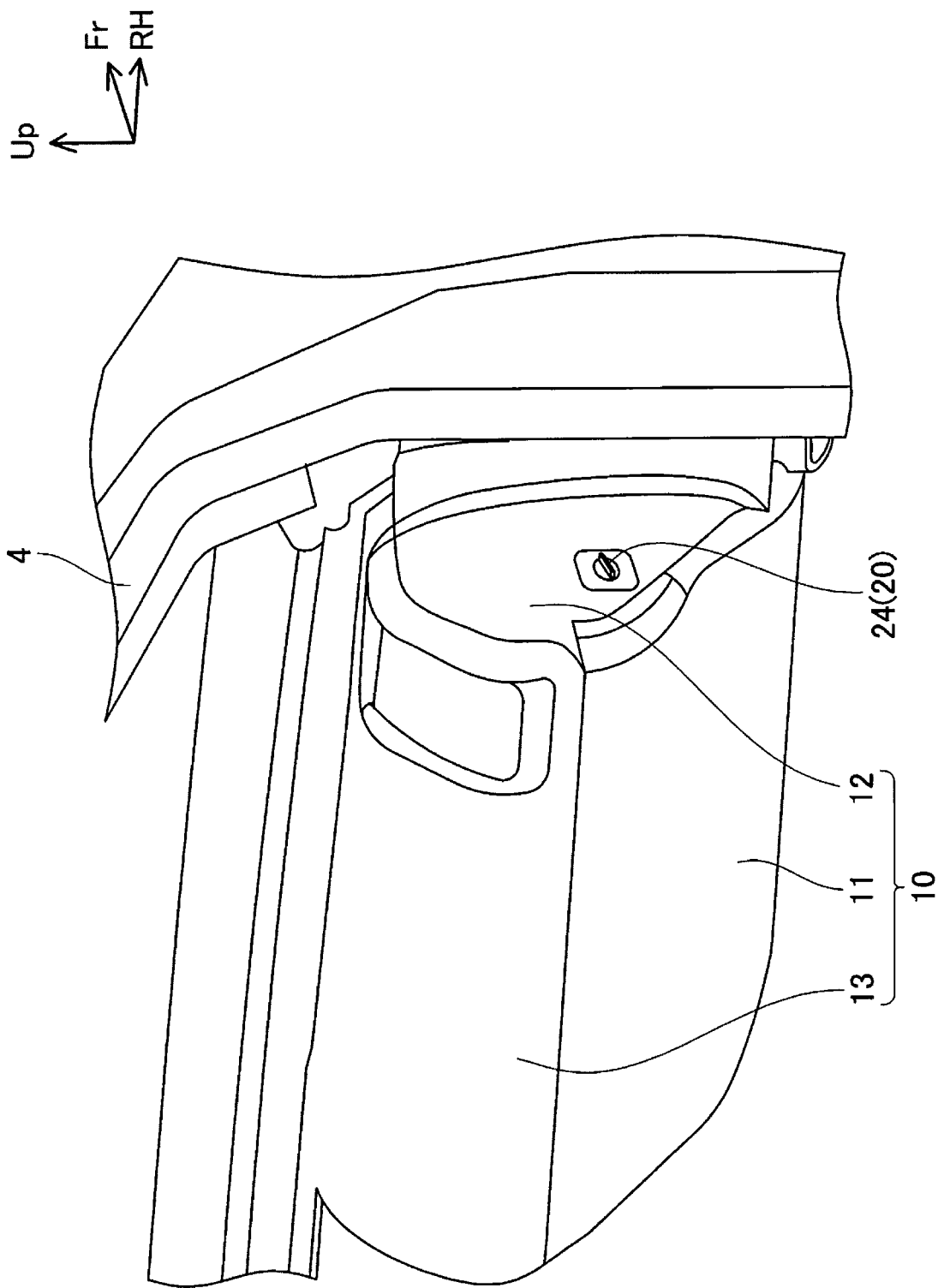
FIG. 2 is a perspective view of the instrument panel.
Figure 3:
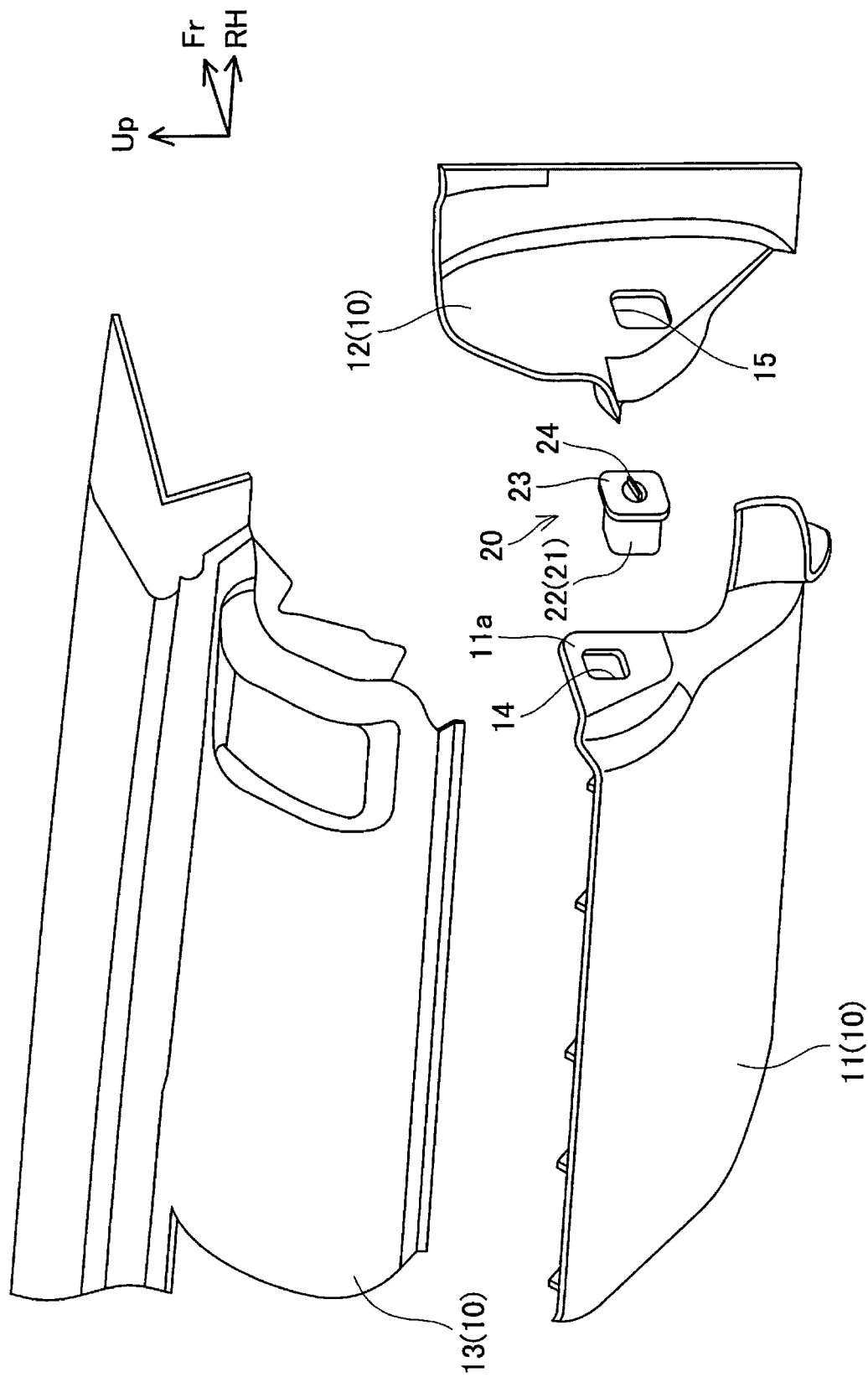
FIG. 3 is an exploded perspective view of the instrument panel.

FIG. 2 is a perspective view of the instrument panel 10. FIG. 2 is a partially perspective view of the instrument panel 10 in front of the front passenger seat. FIG. 3 is an exploded perspective view of the instrument panel 10, corresponding to the perspective view of FIG. 2.

The instrument panel 10 includes a lower panel 11 located in front of front seats (the driver seat 91 and the front passenger seat 92), a side panel 12 facing a front door (a front passenger seat door in the case of the embodiment), and an upper panel 13 covering the upper side of the lower panel 11. The airbag 93 (see FIG. 1) for the front passenger seat is covered with the lower panel 11. As shown in FIG. 2, a switch 20 is placed on the side panel 12, and an operating part 24 is exposed from the side panel 12. The switch 20 is a cutoff switch that deactivates the airbag 93 on the front passenger seat side. A user is able to access the operating part 24 of the switch 20 when the front door (the front passenger seat door in the case of the embodiment) is open. In other words, the operating part 24 of the switch 20 is hidden by the front door (front passenger seat door).

As shown in FIG. 3, the lower panel 11 of the instrument panel 10 includes a lower panel side 11a extending along the back side of the side panel 12. In other words, the lower panel side 11a overlaps the side panel 12 on the back side of the side panel 12. The lower panel side 11a has a hole 14. A case 22 of the switch 20 is fitted to the hole 14. A body 21 of the switch 20 is accommodated in the case 22. The switch 20 (case 22) has a flange 23. The flange 23 is anchored to the edge of the hole 14 of the lower panel side 11a. The side panel 12 also has a hole 15. The operating part 24 of the switch 20 is exposed through the hole 15. The case 22 and the flange 23 are made of a resin.

Figure 4:
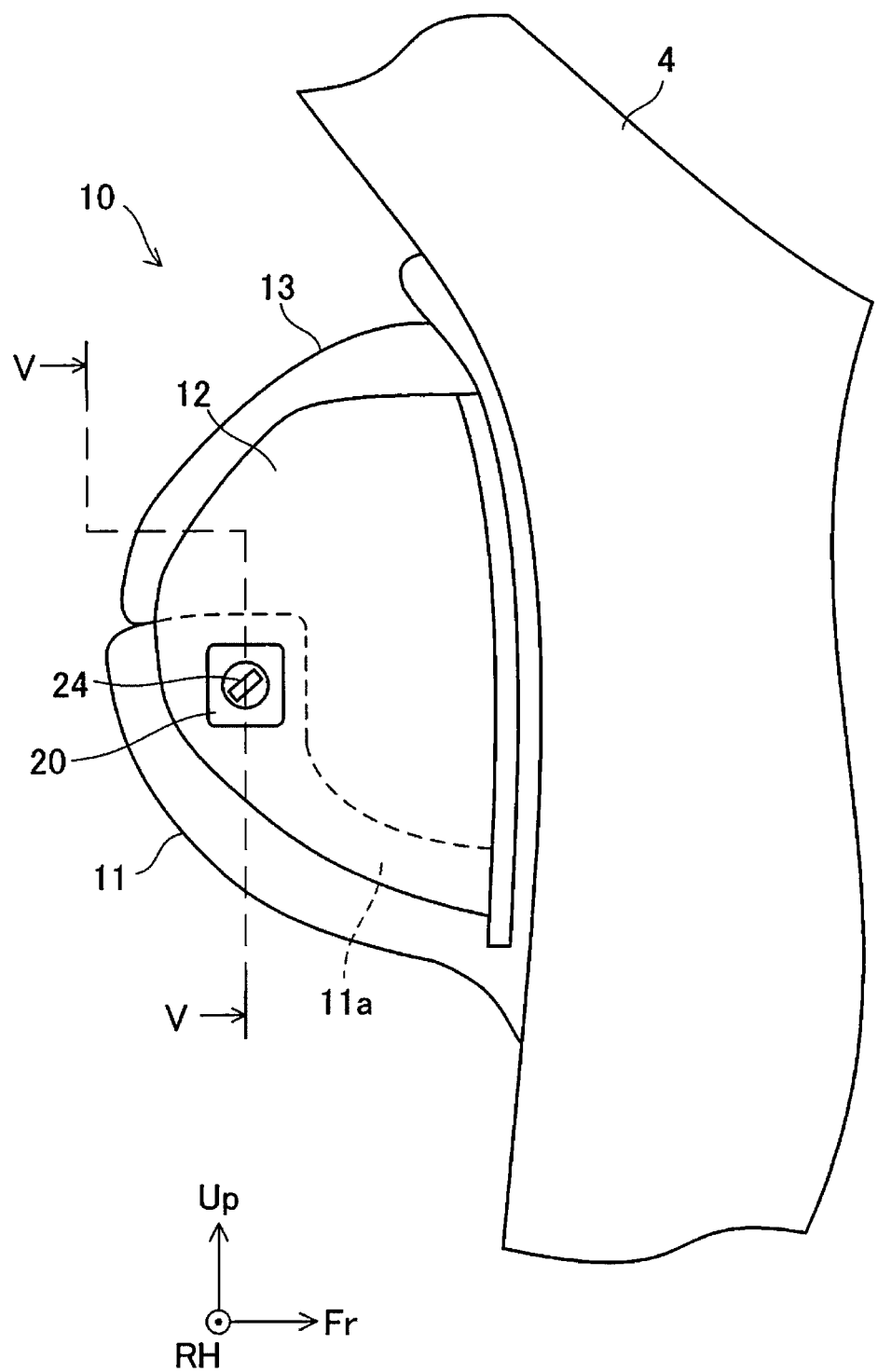
FIG. 4 is a side view of the instrument panel.

FIG. 4 is a side view of the instrument panel 10. As shown in FIG. 4, the lower panel side 11a overlaps part of the side panel 12, and the switch 20 is disposed in a range in which the lower panel side 11a and the side panel 12 overlap.

Figure 5:
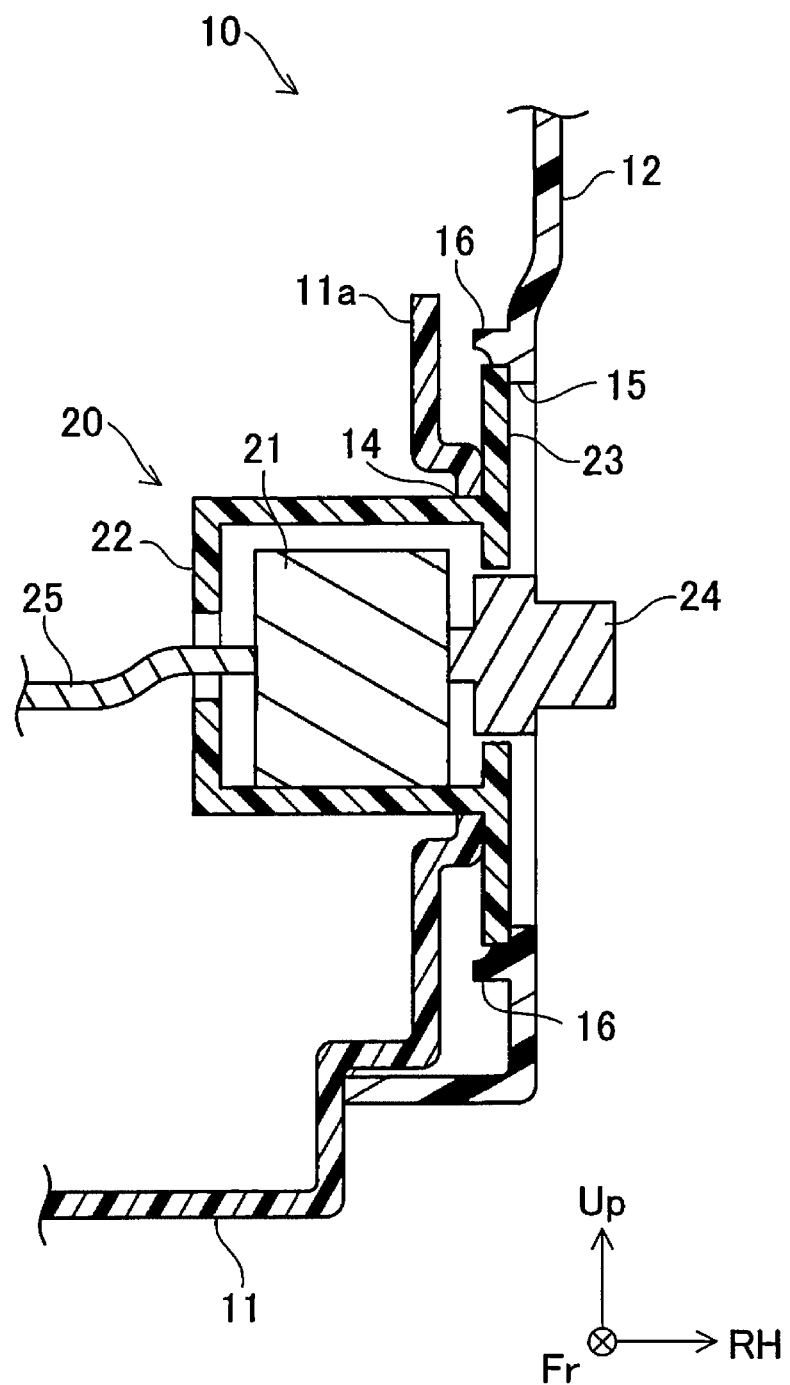
FIG. 5 is a cross-sectional view of the instrument panel, taken along the line V-V in FIG. 4.
Figure 6:
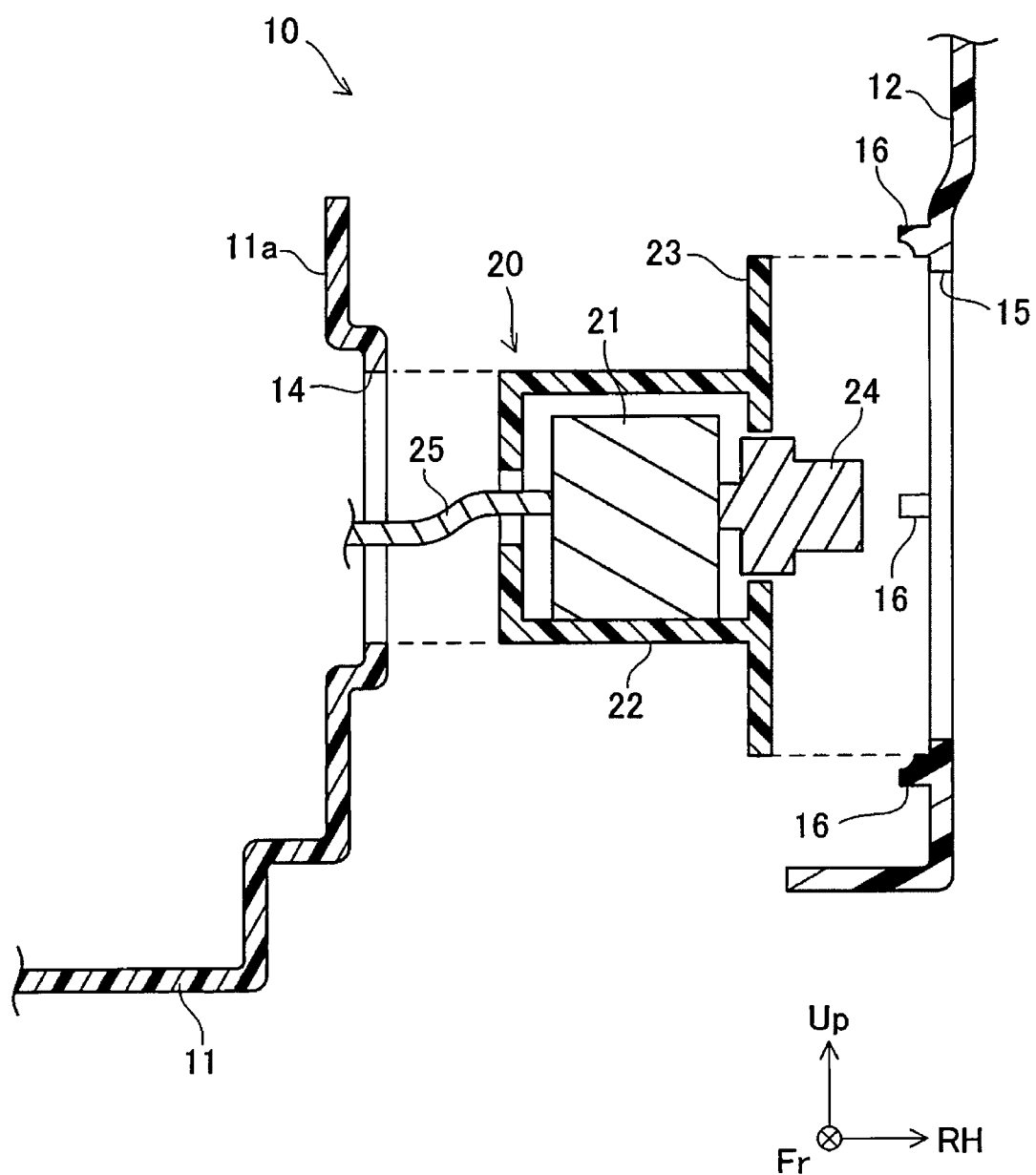
FIG. 6 is an exploded view of the instrument panel shown in FIG. 5.

FIG. 5 is a cross-sectional view of the instrument panel 10, taken along the line V-V in FIG. 4. FIG. 6 is an exploded view of the parts shown in FIG. 5. The switch 20 includes the body 21 accommodated in the case 22, the operating part 24 coupled to the body 21, a cable 25 extending from the body 21, and the flange 23 provided at the opening of the case 22. As described above, the switch 20 is a cutoff switch of the airbag 93, and the cable 25 is connected to the airbag 93. In FIG. 5 and FIG. 6, a specific structure inside the body 21 is not shown.

The switch 20 is fixed to the lower panel side 11a. More specifically, the lower panel side 11a has the hole 14, the case 22 of the switch 20 is fitted to the hole 14, and the flange 23 of the switch 20 is anchored to the edge of the hole 14.

The side panel 12 has the hole 15, and the operating part 24 of the switch 20 is exposed through the hole 15. The flange 23 of the switch 20 overlaps the edge of the hole 15. A plurality of ribs 16 is provided on the back side of the side panel 12. The ribs 16 are placed so as to surround the hole 15. When the switch 20 is attached to the instrument panel 10, the ribs 16 surround the flange 23 of the switch 20. The ribs 16 surrounding the flange 23 set the relative position of the flange 23 (switch 20) with respect to the side panel 12.

Features of the instrument panel 10 according to the embodiment will be described. The instrument panel 10 includes the switch 20. The switch 20 is fixed to the lower panel side 11a. The operating part 24 of the switch 20 is exposed through the hole 15 provided in the side panel 12. The switch 20 (operating part 24) can be seen from a user when the front door (front passenger seat door) is open. The switch 20 is fixed to lower panel side 11a that cannot be seen from the user. The lower panel side 11a to which the switch 20 is fixed is hidden by the side panel 12. Since a fixing portion of the switch 20 cannot be seen from the user, the switch 20 looks good from the user.

The switch 20 is fixed to the lower panel side 11a, and the lower panel side 11a is covered with the side panel 12. This structure increases the flexibility of arrangement of the switch 20 and the flexibility of design.

The switch 20 is a cutoff switch of the airbag 93, and the switch 20 is placed laterally to the airbag 93. With the instrument panel 10 according to the embodiment, it is beneficial to be able to shorten the cable 25 connecting the airbag 93 and the switch 20.

The flange 23 of the switch 20 overlaps the edge of the hole 15 of the side panel 12. There is no gap between the flange 23 and the side panel 12. The flange 23 is positioned by the ribs 16 provided on the side panel 12 so as to surround the hole 15. The position of the switch 20 is accurately set with respect to the side panel 12 by the ribs 16.

Points to remember related to the technology described in the embodiment will be described. The operating part 24 of the switch 20 may be any of a lever, a dial, and a button. Alternatively, the operating part 24 may be a keyhole into which a key of a vehicle is inserted. In this case, the switch 20 deactivates the airbag 93 when the key is inserted in the keyhole (operating part 24) and turned. The switch 20 that does not operate unless the key is inserted provides a benefit that the switch 20 is not erroneously operated.

The instrument panel 10 according to the embodiment includes the switch 20 on the side panel 12 on the front passenger seat side. A switch may be provided on a side panel on the driver seat side. A switch may be a switch for purposes other than a cutoff switch of an airbag.

Specific examples of the disclosure are described in detail above; however, these are only illustrative and are not intended to limit the appended claims. The technology described in the appended claims also encompasses various modifications and changes from the specific examples illustrated above. The technical elements described in the specification or the drawings exhibit technical usability solely or various combinations and are not limited to combinations of the appended claims at the time of filing the application. The technology illustrated in the specification and drawings can achieve multiple purposes at the same time and has technical usability by achieving one of those purposes.

What is claimed is:

1. An instrument panel for a vehicle, the instrument panel comprising:
   a lower panel located in front of a front seat;
   a side panel facing a front door; and
   a switch, wherein:
   the lower panel includes a lower panel side overlapping the side panel on a back side of the side panel;
   the switch is fixed to the lower panel side, and an operating part of the switch is exposed through a first hole provided in the side panel;
   the lower panel side includes a second hole overlapping the first hole in the side panel;
   the switch further includes
      a case fitted into the second hole, and
      a flange extending from the case and overlapping (a) an edge of the first hole and (b) an edge of the second hole;
   the instrument panel further comprises a plurality of ribs provided on the back side of the side panel and surrounding the flange; and
   the flange is sandwiched (i) between the edge of the second hole of the lower panel side and the edge of the first hole of the side panel in a first direction and (ii) between the plurality of ribs in a second direction crossing the first direction, to fix the switch to the lower panel side.

2. The instrument panel according to claim 1, wherein the switch is a cutoff switch configured to deactivate an airbag.

3. The instrument panel according to claim 1, wherein the side panel is placed on a front passenger seat side.

* * * * *